United States Patent [19]

Shibayama et al.

[11] 3,894,251

[45] July 8, 1975

[54] ELASTIC SURFACE WAVE TRANSDUCER

[75] Inventors: Kimio Shibayama; Hiroaki Sato, both of Sendai, Japan

[73] Assignee: Kimio Shibayama, Sendai, Japan

[22] Filed: Aug. 26, 1974

[21] Appl. No.: 500,696

[30] Foreign Application Priority Data

Aug. 31, 1973 Japan ............................... 48-97887

[52] U.S. Cl. .................. 310/9.8; 310/8.1; 310/30 R; 310/72

[51] Int. Cl.² .......................................... H01V 7/00

[58] Field of Search ....................... 310/8.1, 9.7, 9.8; 333/30 R, 72

[56] References Cited

UNITED STATES PATENTS

| | | | |
|---|---|---|---|
| 3,689,784 | 9/1972 | Klerk | 310/9.8 |
| 3,801,935 | 4/1974 | Mitchell | 310/9.8 X |
| 3,801,937 | 4/1974 | Bristol | 310/9.8 X |
| 3,831,044 | 8/1974 | Speiser | 310/9.8 |
| 3,836,876 | 9/1974 | Marshall et al. | 310/9.8 X |

*Primary Examiner*—Mark O. Budd
*Attorney, Agent, or Firm*—Flynn & Frishauf

[57] ABSTRACT

An interdigital transducer used in an elastic surface wave device and constituted by a pair of electrodes each having a common electrode and a plurality of electrode fingers connected to the common electrode, the overlap lengths of electrode fingers of the paired electrodes being uniform throughout the transducer. The electrode fingers of one of the paired electrodes are divided into sections. Capacitors are connected between the respective sections and the common electrode. Excitation electric field strength can be weighted in proportion to a weighting function according to the capacitance value of the respective capacitors and the number of electrode fingers in the respective sections.

9 Claims, 5 Drawing Figures

ELASTIC SURFACE WAVE TRANSDUCER

Figure 1:
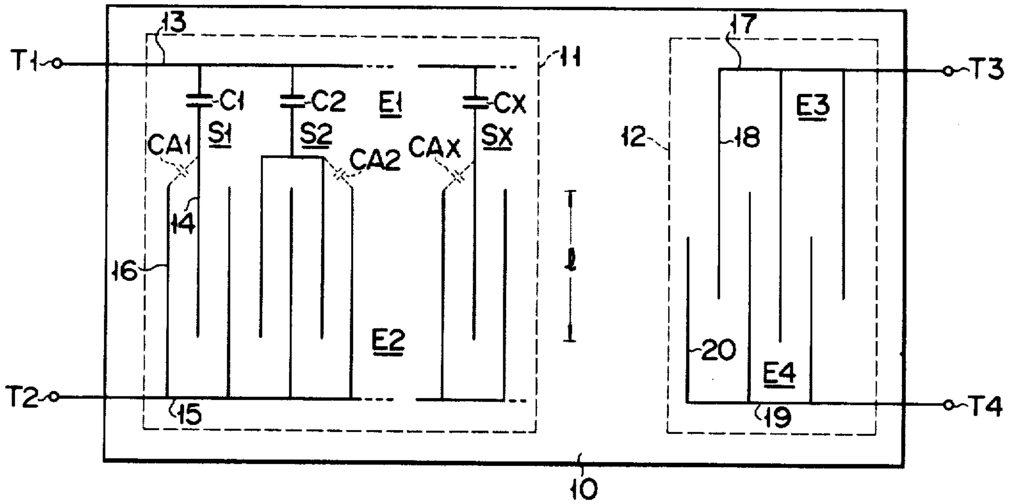

This invention relates to an elastic surface wave transducer.

An elastic surface wave device (also referred to as an acoustic surface wave device) used in the VHF band and the UHF band as a filter or delay line is already known to those skilled in the art. An elastic surface wave device has transmitting and receiving interdigital transducers disposed on a piezoelectric substrate. These transducers are used to convert electrical signals into elastic surface waves or vice versa.

A known transducer used in an elastic surface wave device is uniform overlap length interdigital type comprising first and second electrodes disposed on a substrate of piezoelectric material and each having a common electrode connected to an external terminal and a plurality of electrode fingers connected to the common electrode, the overlap lengths of the electrode fingers of the first and second electrodes being uniform throughout the transducer.

However, the above-mentioned prior art uniform overlap length interdigital transducer has unsatisfactory frequency characteristics. Further, such transducer has a passband width bearing a substantially inverse proportion to the number of electrode fingers.

In Proc. IEEE, Vol. 59, No. 3, p.393, Mar. (1971) is set forth a weighting transducer with so-called "apodized electrode" arrangement for improving the frequency response of the transducer. With this apodized type weighting transducer, the overlap lengths of the electrode fingers are made to vary in proportion to a weighting function, causing the widths of excited elastic surface wave beams to be weighted in proportion to the weighting function. Though a weighting function with respect to the frequency transmitting property of an ideal filter is sin $x/x$, a practically used function is, for example, $$\frac{\sin x}{x} \cdot \frac{\pi^2}{\pi^2 + x^2}$$

approximating the function $$\frac{\sin x}{x}.$$

When the apodized transducers are used as input and output transducers, it is impossible to obtain the product property of the transfer functions of both transducers. For a prominent guaranteed attenuation in the stop band, however, the product property should be attained. Following is the reason why apodized type weighting transducers used as input and output ones can not provide a desired product of transfer functions. The electrode fingers of the output transducer overlapping each other in a small length can not fully pick up an elastic surface wave having a larger beam width from the input transducer, failing to produce an output signal proportional to the weight of the beam width.

To obtain, therefore, the product of transfer functions, an apodised type weighting transducer is combined with a uniform overlap length type transducer. In this case, the electrodes of the apodised type weighting transducer should be made more precisely than in the case with two weighting transducers in order to attain a prominent guaranteed attenuation in the stop band. However, this is difficult to realize.

It is accordingly an object of this invention to provide a weighting transducer capable of easily achieving the product property of transfer functions regardless of the types of other transducers used in combination with the subject transducer.

Another object of the invention is to provide a uniform overlap length interdigital transducer with an improved frequency response.

A weighting transducer according to this invention is characterized in that a plurality of electrode fingers of one of two electrodes constituting uniform overlap length interdigital transducer are divided into sections each including at least one electrode finger and that capacitors are connected between the sections and a common electrode of the electrode. Thus, the strength of an excitation electric field is weighted in proportion to a weighting function by selecting the capacitance of the capacitors and/or the number of electrode fingers constituting the respective sections.

The capacitor may be prepared in the following manner. The electrode fingers of the respective sections and the lower electrodes of the capacitors connected to the sections are first formed on a piezoelectric substrate. A dielectric thin film of, for example, silicon monoxide or silicon dioxide is deposited on each of the lower electrodes of the capacitors. Further on the dielectric film is deposited a conductor as an upper common electrode to the capacitors.

The areas of the lower electrodes of the capacitors facing the common electrode are made to change with the desired magnitude over which the capacitances of the capacitors should be distributed.

Since the overlap lengths of the interdigital electrode fingers of a weighting transducer according to this invention are uniform throughout the transducer, the transducer can easily provide a desired product property of transfer functions, even when used with the apodized type weighting transducer or uniform overlap length type transducer. The transducer of this invention can be readily manufactured by, for example, the photolithographic fabrication techniques of a standard integrated circuit. Further, the rejection of the side lobe of the present transducer can be easily effected to a larger extent than 10 dB as compared with the ordinary uniform overlap length interdigital transducer.

Figures 2, 4:
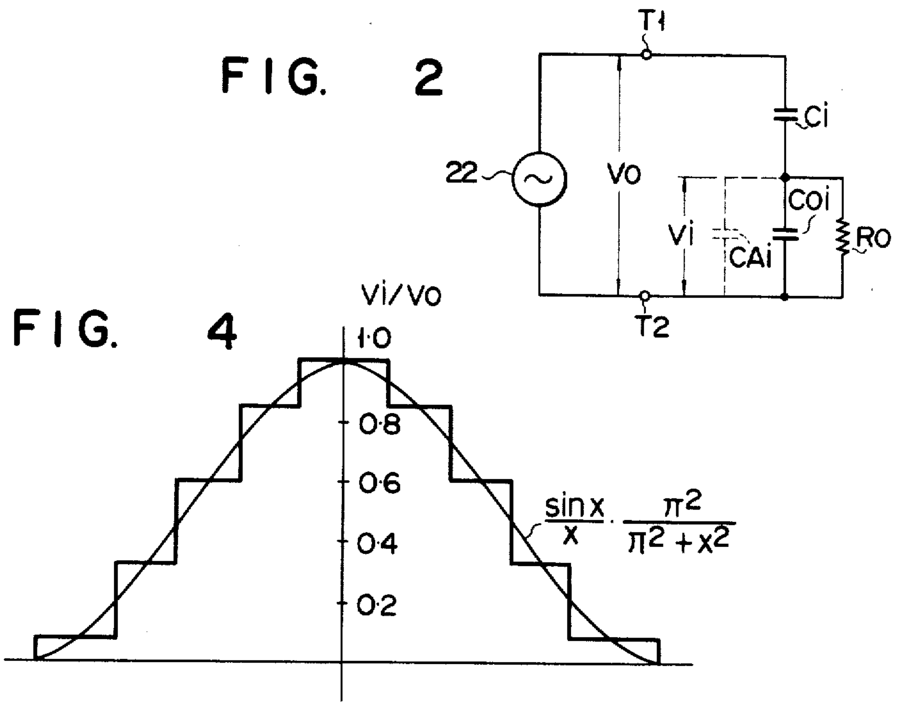
Figure 3:
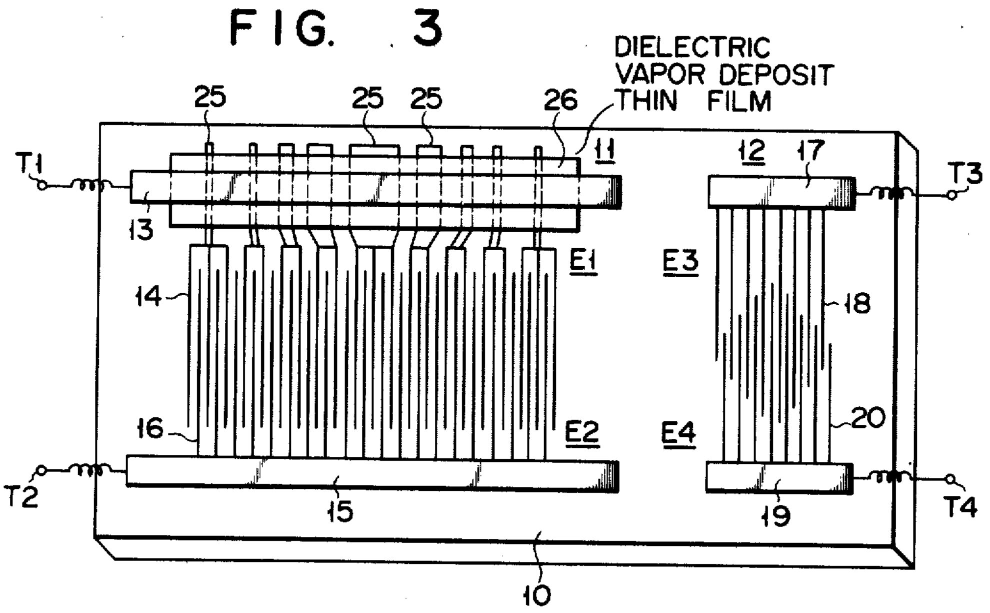
Figure 5:
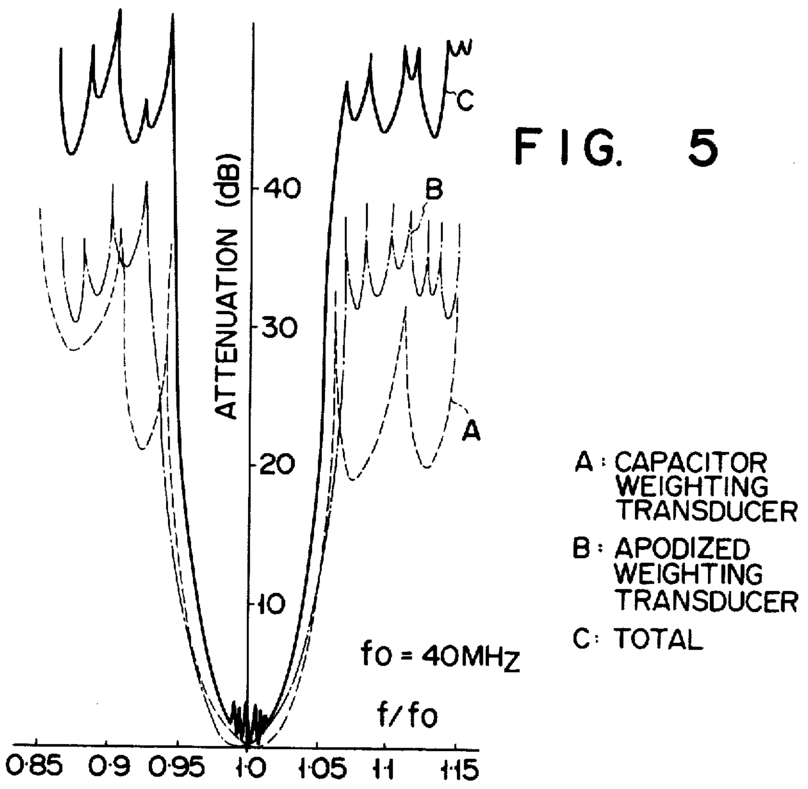

FIG. 1 schematically illustrates an elastic surface wave device using a weighting transducer according to this invention;

FIG. 2 is an equivalent circuit diagram of the respective sections of the present weighting transducer;

FIG. 3 indicates the practical arrangement of the present weighting transducer;

FIG. 4 diagrammatically shows a weighting fuction applied to the weighting transducer of FIG. 3; and FIG. 5 indicates the characteristics of the present weighting transducer, those of the apodized type weighting transducer and the overall characteristics of these transducers combined.

As shown in FIG. 1, an input transducer 11 and an output transducer 12 are disposed on the same face of a substrate 10 made of piezoelectric material such as quartz crystal, lithium niobate, lithium tantalate and the like. In this case, the input transducer 11 consists of the weighting transducer of this invention and the output transducer 12 is formed of the known apodized type weighting transducer.

The input transducer 11 comprises first and second electrodes E1, E2 formed on the substrate 10 and made of conductive material such as aluminium or gold. The first electrode E1 comprises a common electrode 13 connected to an external terminal T1 and a plurality of electrode fingers 14 connected to the common electrode 13. The second electrode E2 includes a common electrode 15 connected to an external terminal T2 and electrode fingers 16 connected to the common electrode 15. The fingers 14, 16 of the first and second electrodes E1, E2 are arranged so as to interdigitate each other as shown in FIG. 1. The interdigital fingers 14, 16 are made to have a uniform overlap length $l$ throughout the transducer. In this invention, one electrode of the input transducer 11, for example, the indicated first electrode E1 has its fingers 14 divided into a plurality of sections S1 to Sx, each including at least one electrode finger. Capacitors C1 to C$x$ are connected between the sections and the common electrode 13. The characters CA1 to CA$x$ denote electrostatic capacitances additionally provided for the reason given later, between the fingers of the respective sections and the corresponding fingers of the second electrode E2.

On the other hand, the apodized type output transducer 12 comprises first and second electrodes E3, E4. The first electrode E3 comprises a common electrode 17 connected to an external terminal T3 and electrode fingers 18 connected to the common electrode 17. The second electrode E4 includes a common electrode 19 connected to an external terminal T4 and electrode fingers 20 connected to the common electrode 19. Unlike the input transducer 11, the apodised type output transducer 12 has the overlap lengths of the interdigital electrode fingers varied throughout the transducer in proportion to a weighting function. Where the apodised type weighting transducer 12 is combined with the uniform overlap length type weighting transducer 11, it is desired that the maximum overlap length of the electrode fingers of the apodised type transducer 12 be equal to the overlap length $l$ of the electrode fingers of the transducer 11.

Since an effective mechanical coupling coefficient is not so large in the elastic surface wave device and, in consequence, interaction between the respective sections can be overlooked, the equivalent circuit of each of the sections S1 to Sx of FIG. 1 may be illustrated as in FIG. 2. The character Vo denotes an output voltage from an excitation source 22 connected to the external terminals T1, T2; V$i$ effective excitation voltage impressed on a section occupying the sequential order of $i$ ($i = 1$ to $x$) across the fingers of the first and second electrodes E1, E2 and adapted to produce an elastic surface wave; C$i$ a capacitance connected in series to the section of the i order; Coi all electrostatic clamped capacitance prevailing across the fingers of the i order section and the corresponding fingers of the second electrode E2; CAi an additional capacitance provided to the i order section; and Ro radiation resistance.

Assuming that the radiation resistance Ro can be overlooked and that the capacitance CAi is not provided, then the effective excitation voltage Vi impressed on the i order section may obviously be expressed by the following equation:

$$V_i = \left(\frac{C_{oi}}{C_i} + 1\right)^{-1} V_o \quad (1)$$

The above equation shows that the effective excitation voltage Vi is substantially determined by the values of the capacitances Coi, Ci. The capacitance Coi varies with the number of electrode fingers included in the $i$ order sections. Thus the capacitance connected to each section and/or the number of electrode fingers thereof can weight the effective excitation voltage, or the strength of the excitation electric field of the section.

There will now be described by reference to FIG. 3 the preferred arrangement of the weighting transducer of this invention using capacitors. Parts of FIG. 3 the same as those of FIG. 1 are denoted by the same numerals. Lower electrodes 25 of the respective capacitors are formed on the substrate 10 integrally with the electrode fingers of the sections. A dielectric thin film 26 of, for example, silicon monoxide or silicon dioxide is deposited on the lower electrodes 25 of the capacitors to a thickness of, for example, 1,500A. An upper common electrode 13 of the capacitors is deposited on the dielectric film 26. The capacitances of the capacitors vary with the areas of the lower electrodes 25 which face the upper common electrode 13.

The transducer of this invention can be easily manufactured by the photolithographic fabrication techniques of a standard integrated circuit. It will be noted that the overlap length, width and center-to-center spacing of the electrode fingers included in the present transducer are about 5 mm, 25 $\mu$m and 50 $\mu$m respectively.

Provision of additional capacitances CA1 to CAx shown in FIG. 1 is for the following reason. Where, with the weighting transducer 11 of FIG. 3, the strength of an excitation electric field is made proportional to the weighting function $$\frac{\sin x}{x} \cdot \frac{\pi^2}{\pi^2 + x^2}$$

indicated in FIG. 4, it sometimes happens that the capacitances provided near the end portions of the transducer should be reduced to such a minute extent as is difficult to realize. If, in this case, the additional capacitances of FIG. 1 are provided to the respective sections, then the aforesaid equation (1) may be rewritten as follows:

$$V_i = \left(\frac{C_{oi} + C_{Ai}}{C_i} + 1\right)^{-1} V_o \quad (2)$$

This equation (2) shows that provision of the additional capacitance CAi allows the capacitance Ci to have a large value in obtaining the same value of Vi. Such additional capacitance can be provided by a deposited dielectric thin film of, for example, silicon monoxide or silicon dioxide. The film has a capacitance varying with its thickness. Where necessary, the additional capacitances CA1 to CAx may of course have values in accordance with a distribution.

With the elastic surface wave device of FIGS. 1 and 3, whose input transducer 11 consists of the capacitor type weighting transducer of this invention and whose output transducer 12 is formed of the apodized type weighting transducer, an electric surface wave generated by the input transducer has its strength weighted in proportion to a weighting function. What deserves notice is that the strength remains constant throughout the beam width or the overlap length of the electrode fingers. Where, therefore, and elastic surface wave from the input transducer 11 having a constant beam width and strength is supplied to the output transducer 12 having some of the electrode fingers overlapped by each other in a smaller length and the others overlapped by each other in a larger length, then, the output transducer 12 generates outputs having amplitudes proportional to the smaller and larger overlap lengths of the electrode fingers thereof, each time the above-mentioned surface wave from the input transducer 11 passes through the sections of the different overlap lengths. Namely, impulse-response wave forms at the electrode sections of a smaller overlap length and those of a larger overlap length bear a relationship of precise similarity. Therefore, the overall transfer function between the input transducer 11 and output transducer 12 can be expressed as the product of the transfer function of the input transducer 11 and that of the output transducer 12.

The foregoing description referred to the case where the surface wave device consisted of an input transducer of this invention and an output transducer of the apodized type. However, two capacitor weighting transducers of the invention may be used as input and output transducers. Of course, the present capacitor weighting transducer may be combined with not only the apodized type, but also with any other form of transducer such as a uniform overlap length type transducer. In such combination, the capacitor weighting transducer of this invention may be used as an input or output transducer.

FIG. 5 presents experimental data, where a $$\frac{\sin x}{x} \cdot \frac{\pi^2}{\pi^2 + x^2}$$

type capacitor weighting transducer was used for reception and a $$\frac{\sin x}{x} \cdot \frac{\pi^2}{\pi^2 + x^2}$$

type apodized weighting transducer was used for transmission. The experiment of FIG. 5 was carried out by arranging a detecting uniform overlap length interdigital transducer having a smaller number of electrode fingers and fully broad band characteristics on a piezoelectric substrate made of 131° rotated Y-cut X-propagating $LiNbO_3$ crystal between the capacitor weighting transducer of this invention and apodized weighting transducer. The curve A of FIG. 5 shows the frequency characteristics of the capacitor weighting transducer detected by the detecting uniform overlap length transducer. The curve B indicates the frequency characteristics of the apodized weighting transducer detected by the detecting transducer. The curve C shows the overall frequency characteristics between the capacitor weighting transducer of this invention and the apodized weighting transducer. FIG. 5 also shows that, in the pass band and transition region, a sum of attenuations in the capacitor and apodised weighting transducers is substantially equal to the attenuation in the total curve C, proving that a product of the transfer functions of both transducers was obtained. In the stop band, however, the product property as realized in the pass band and transition region is not obtained due to the effect of an electrical leakage component and a spurious bulk wave component. According to another experiment using a plate of $LiNbO_3$ crystal capable of suppressing spurious components, and capacitor and apodized weighting transducers was obtained higher guaranteed attenuation than 50 dB.

Though it is theoretically possible to use not only capacitors but also inductors and resistors in order to weight the strength of an excitation electric field by means of a uniform overlap length type transducer, yet the capacitor type weighting transducer of this invention is preferred in consideration of ease of manufacture and prevention of electric loss.

What we claim is:

1. An electric surface wave interdigital transducer comprising first and second electrodes disposed on a piezoelectric substrate and each having a common electrode connected to an external terminal and a plurality of electrode fingers connected to said common electrode, the overlap lengths of the interdigital electrode fingers of said first and second electrodes being uniform throughout the transducer, characterized in that the electrode fingers of said first electrode are divided into a plurality of sections each including at least one electrode finger; and that capacitors are connected between the finger or fingers of the respective sections and said common electrode.

2. An elastic surface wave transducer according to claim 1, wherein the capacitor comprises a thin dielectric film.

3. An elastic surface wave transducer according to claim 1, wherein additional capacitors are provided between the electrode fingers of the respective sections of said first electrode and the corresponding electrode fingers of said second electrode.

4. An elastic surface wave transducer according to claim 3, wherein the capacitor comprises a thin dielectric film.

5. An elastic surface wave interdigital transducer comprising:

a substrate made of piezoelectric material;

first and second electrodes disposed on said substrate and each having a common electrode connected to an external terminal and a plurality of electrode fingers connected to said common electrode, the overlap lengths of interdigital electrode fingers of said first and second electrodes being uniform throughout said transducer; and capacitors connected between said common electrode and said electrode fingers of said first electrode.

6. An elastic surface wave interdigital transducer according to claim 5, wherein said capacitor comprises a dielectric thin film.

7. An elastic surface wave device comprising:

a substrate of piezoelectric material;

a first interdigital transducer disposed on said substrate, said first interdigital transducer including first and second electrodes each having a common electrode connected to an external terminal and a plurality of electrode fingers connected to said common electrode, the overlap lengths of interdigital electrode fingers of said first and second electrodes being uniform throughout said first transducer, and capacitors connected between said common electrode and electrode fingers of said first electrode; and a second interdigital transducer disposed on said substrate and including third and fourth electrodes each having a common electrode connected to an external terminal and a plurality of electrode fingers connected to said common electrode, the overlap lengths of the interdigital electrode fingers of said third and fourth electrodes varying throughout said second transducer.

8. An elastic surface wave device according to claim 7, wherein said capacitor includes a dielectric thin film.

9. An elastic surface wave device according to claim 7, wherein a maximum overlap length of interdigital electrode fingers of said second transducer is substantially equal to the overlap length of interdigital electrode fingers of said first transducer.

* * * * *